(12) United States Patent
Sankaranaynan et al.

(10) Patent No.: US 8,126,439 B1
(45) Date of Patent: Feb. 28, 2012

(54) PERSONA MANAGEMENT FOR MOBILE ENABLING SERVICES

(75) Inventors: Pallavur Sankaranaraynan, Overland Park, KS (US); Lyle W. Paczkowski, Mission Hills, KS (US); Brian D. Mauer, Shawnee, KS (US); Matthew C. Schlesener, Shawnee, KS (US); Sean Alan Isaacson, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 962 days.

(21) Appl. No.: 11/978,834

(22) Filed: Oct. 30, 2007

(51) Int. Cl.
*H04M 3/42* (2006.01)

(52) U.S. Cl. ............... 455/414.1; 455/414.2; 455/414.4; 455/432.3

(58) Field of Classification Search .............. 455/414.1, 455/403, 452.1, 452.2, 552.1, 553.1, 414.2, 455/414.4, 432.3; 379/201.2; 709/225, 204, 709/209, 226, 227, 206, 217; 705/7, 8, 35, 705/26, 21, 28; 717/174, 171, 178, 176, 717/102; 725/62

See application file for complete search history.

(56) References Cited

U.S. PATENT DOCUMENTS

| | | | |
|---|---|---|---|
| 6,020,915 A | 2/2000 | Bruno et al. | |
| 6,611,867 B1* | 8/2003 | Bowman-Amuah | 709/224 |
| 6,944,150 B1 | 9/2005 | McConnell et al. | |
| 7,490,136 B2* | 2/2009 | Suzuki | 709/217 |
| 2003/0065802 A1* | 4/2003 | Vitikainen et al. | 709/231 |
| 2003/0110234 A1* | 6/2003 | Egli et al. | 709/217 |
| 2004/0162818 A1* | 8/2004 | Shaw | 707/3 |
| 2005/0213609 A1 | 9/2005 | Brusilovsky et al. | |
| 2006/0114882 A1 | 6/2006 | Mills | |
| 2007/0240189 A1* | 10/2007 | Paila | 725/62 |
| 2009/0187633 A1* | 7/2009 | Koponen et al. | 709/206 |
| 2009/0199230 A1* | 8/2009 | Kumar et al. | 725/32 |
| 2010/0020728 A1* | 1/2010 | Jefferson et al. | 370/260 |
| 2010/0208634 A1* | 8/2010 | Eng et al. | 370/310 |

* cited by examiner

*Primary Examiner* — Jean Gelin

(57) ABSTRACT

Multimedia services are provided to a subscriber within a domain of a communication network, wherein the subscriber utilizes one or more predetermined access terminals to access the multimedia services according to a network presence configuration of the subscriber. Each access terminal has respective multimedia capabilities, and the domain includes an application server for accessing the multimedia services. A user profile is established for the subscriber relating respective presence identifiers to a respective user service definition, wherein each user service definition specifies a set of the predetermined access terminals and respective multimedia services to be available for a respective network presence configuration. A current presence identifier of the subscriber is registered. The application server accesses the user profile to determine a user service definition corresponding to the current presence identifier. The subscriber initiates one of the multimedia services by sending a request to the application server from one of the access terminals in the set of predetermined access terminals. The application server interfaces with the multimedia service to obtain multimedia content from the initiated multimedia service. The application server then determines rules of service delivery according to the set of predetermined access terminals. The application server re-formats received multimedia content according to the rules of service delivery for the set of predetermined access terminals. The application server transmits re-formatted multimedia content to the corresponding access terminals.

17 Claims, 6 Drawing Sheets

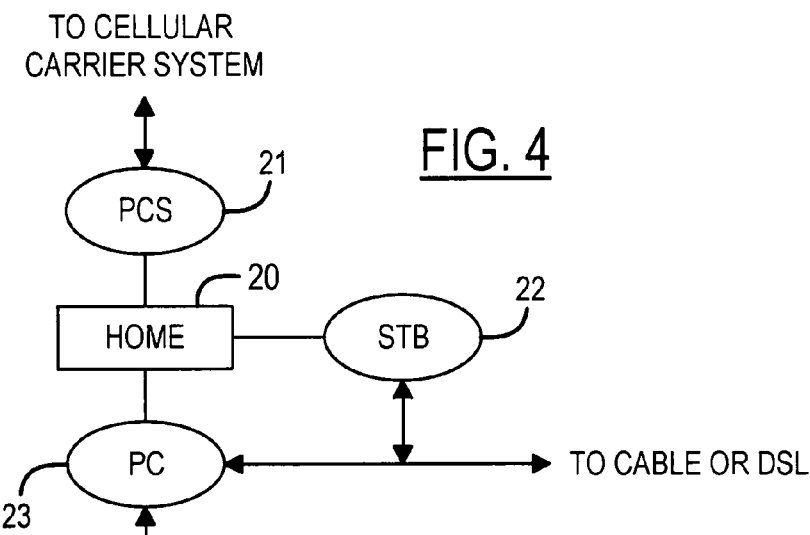
FIG. 4
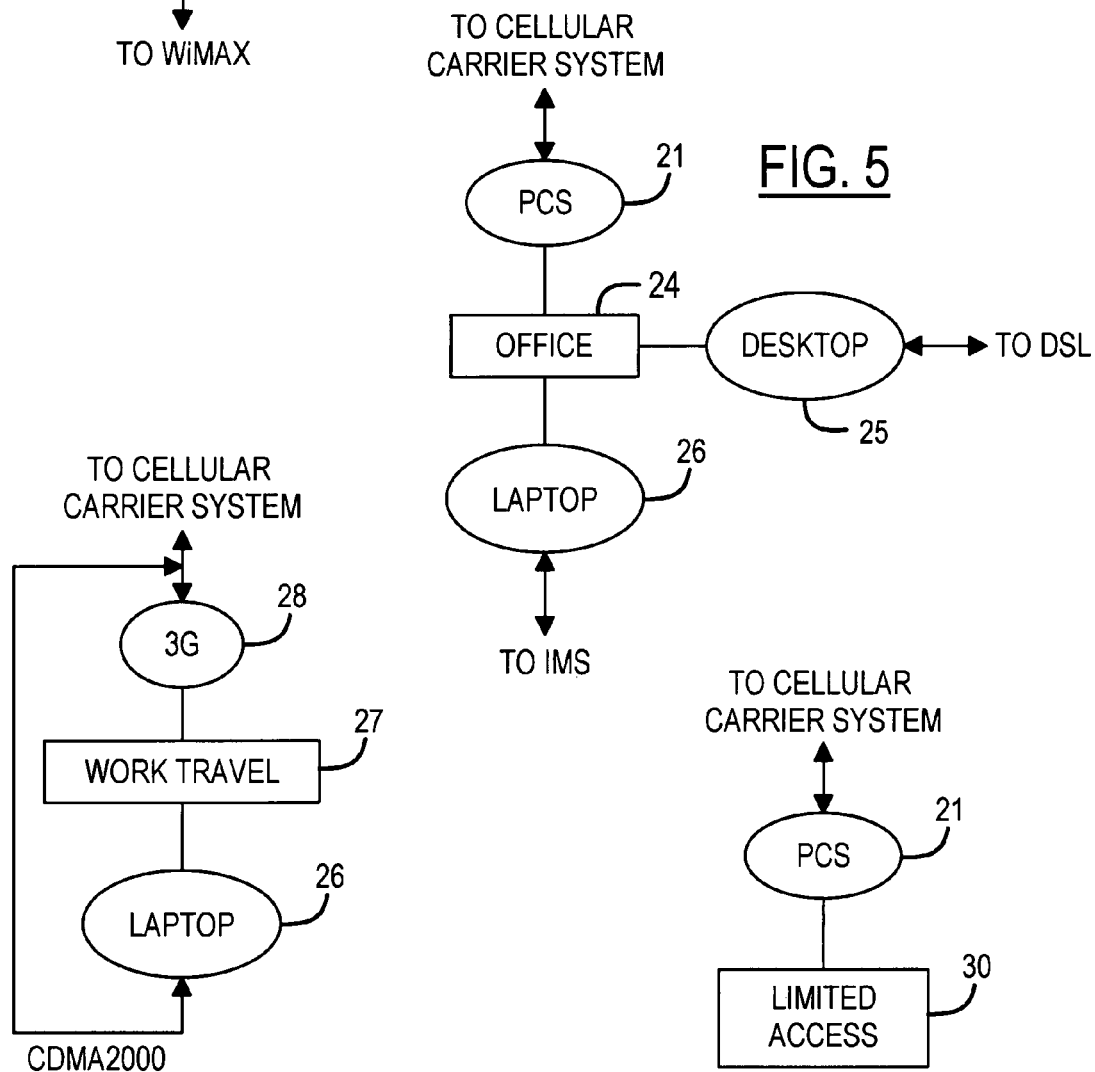
FIG. 5
FIG. 6
FIG. 7

PERSONA MANAGEMENT FOR MOBILE ENABLING SERVICES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to network communications systems, and, more specifically, to a network system for managing multimedia services provided to subscribers of a telecommunications service provider in a manner adapted to the instantaneous access methods and devices used by the subscribers (i.e., their "presence").

The multimedia and data capabilities of both wireless devices (e.g., cell phones) and the service providers' telecommunications networks have been rapidly increasing. Services and applications historically associated only with either fixed or mobile terminals have converged so that the distinction between fixed and mobile services is less significant. Applications such as internet browsing that initially were performed primarily only from fixed minicomputer workstations are now routinely done using wireless telephone devices such as PDA's. Likewise, phone services such as audio and video conferencing are now accomplished using computer terminals connected over data networks.

Users of any particular communication/multimedia service typically have many optional device capabilities and service levels to choose from. For example, a subscriber of a cellular network may choose from many different phones with differing multimedia specifications, from a basic phone to a smart phone or a PDA phone. Using their selected phone, various data services such as text messaging can be received. The provider of the text messaging service configures it to receive messages from and send messages to many different types of terminals having different text or graphics capabilities. A server or other device providing the service content to the end user terminal (i.e., phone or other device) must adapt the transmitted content to the type of receiving device. In the prior art, the server identified the capability of the end user terminal in response to the specific client software used by the terminal, i.e., the dedicated application software used by the terminal to access the server. The requirement to use this client/server model in order to identify the end user terminal capabilities is undesirable within the context of an integrated service provider such as a cellular carrier because of increased cost and loss of flexibility in providing integrated services.

SUMMARY OF THE INVENTION

The present invention has the advantage of eliminating the need to rely on specific client software loaded on an access terminal in order to identify the multimedia capabilities of the access terminal. Instead, the invention uses a dynamic rules based persona policy management system that is updated with the user's presence on the network, e.g., whether they are on a CDMA network, a WiMAX network, and/or a wireline broadband network like Cable or DSL. It delivers content that is appropriately optimized (e.g., formatted) for the particular user terminal(s) associated with the user presence. The invention uses novel architecture in the carrier network (i.e., domain) that is aware of the users' presence which can be updated via their mobile terminal. An application server is tied to multiple core signaling platforms like Cable, IMS and CDMA. The application server queries a rules engine that uses a combination of services that are either disabled or enabled using the logic around a certain presence setting. Based on the rules, the application server re-formats content to be sent to the terminal(s) and may also send configuration commands to gateway elements or to content servers in order to implement the rules within the various Cable, IMS, and air-interface environments. Although CDMA and WiMAX are highlighted in the examples provided, it will be recognized that GSM, UMB, EUTRAN(LTE), and other air interfaces could also be used in the present invention.

In one aspect of the invention, a method provides multimedia services to a subscriber within a domain of a communication network, wherein the subscriber utilizes one or more predetermined access terminals to access the multimedia services according to a network presence configuration of the subscriber. Each access terminal has respective multimedia capabilities, and the domain includes an application server for accessing the multimedia services. A user profile is established for the subscriber relating respective presence identifiers to a respective user service definition, wherein each user service definition specifies a set of the predetermined access terminals and respective multimedia services to be available for a respective network presence configuration. A current presence identifier of the subscriber is registered. The application server accesses the user profile to determine a user service definition corresponding to the current presence identifier. The subscriber initiates one of the multimedia services by sending a request to the application server from one of the access terminals in the set of predetermined access terminals. The application server interfaces with the multimedia service to obtain multimedia content from the initiated multimedia service. The application server then determines rules of service delivery according to the set of predetermined access terminals. The application server re-formats received multimedia content according to the rules of service delivery for the set of predetermined access terminals. The application server transmits re-formatted multimedia content to the corresponding access terminals.

BRIEF DESCRIPTION OF THE DRAWINGS

FIGS. 4-7 show various network presence configurations for a subscriber.

DETAILED DESCRIPTION OF PREFERRED EMBODIMENTS

Figure 1:
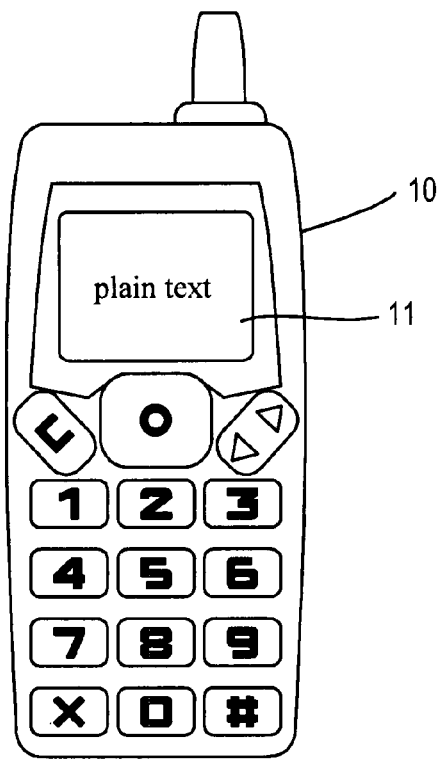
FIGS. 1-3 are views of various access terminals having different multimedia capabilities.
Figure 2:
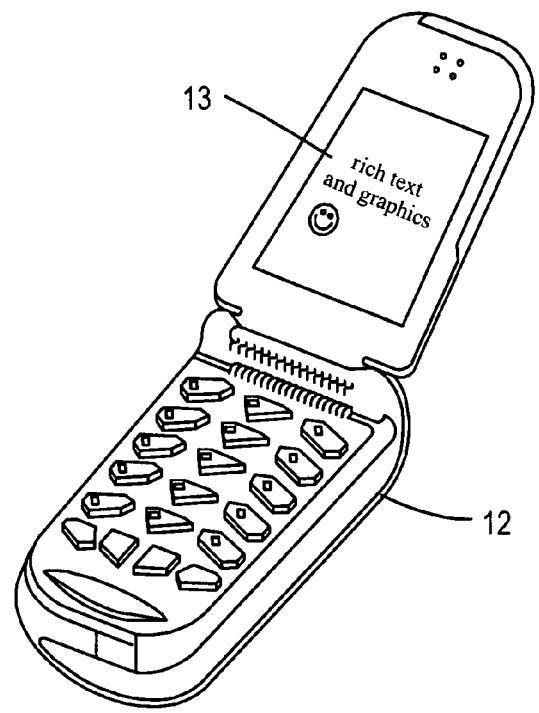
Figure 3:
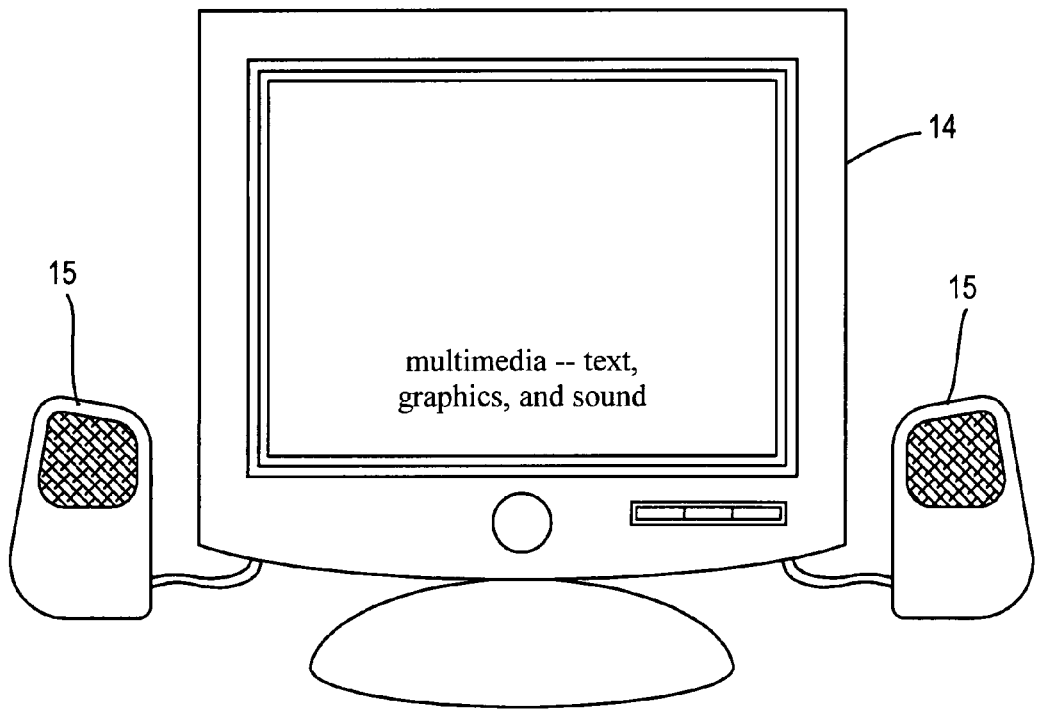

Referring now to FIG. 1, an access terminal in the form of a basic cellular telephone 10 is shown including an alphanumeric screen 11 for displaying plain text. In interfacing with an SMS messaging service, phone 10 may be typically limited to displaying ASCII characters, with messages being limited to a predetermined number of characters. As an example of an access terminal with somewhat greater capabilities, FIG. 2 shows a digital cellular telephone 12 having a display screen 13 capable of generating both rich text and graphics. Thus, an SMS message can be received and reproduced with a greater selection of available characters (e.g., fonts) and the potential for embedded graphics, for example. With even more capability, FIG. 3 shows a display monitor 14 and speakers 15 of a personal computer which are capable of multimedia output in the form of rich text, graphics, sound, and video. In each case, the device may be capable of receiving text or SMS messages provided that the messages received are properly adapted to the capabilities of the particular device. As already mentioned, each prior art device has identified its particular capabilities by means of a corresponding client application that is running on the particular terminal which sends signals to the remote server to identify the capabilities. The present invention removes this limitation and allows the terminals in FIGS. 1-3 to interface with various multimedia based services without requiring a corresponding client application software to be contained on the access terminal. Instead, the access terminal only needs software for interfacing with other devices of the network provider which are present within the domain.

FIGS. 4-7 show examples of different network presence configurations that may be used by any particular subscriber of the network depending upon where the subscriber is located at any particular time. Thus, FIG. 4 shows a "home" presence as it may be defined by a respective user. Thus, a home user represented by box 20 may have available a PCS terminal 21, a set top box (STB) 22, and a personal computer (PC) 23 while at their home location. The user presence while at home is further defined by the network connections of the terminals, e.g., the cellular carrier system used by PCS phone 21, a WiMAX connection available to PC 23, and an ISP connection to a cable or DSL modem available to both STB 22 and PC 23.

FIG. 5 shows another network presence configuration of the user when at their office. Thus, an "office" presence 24 may comprise use of PCS terminal 21, a desktop computer 25, and a laptop 26. In the "office" configuration, desktop 25 is connected to an internet service provider via a DSL modem while laptop 26 obtains a data network connection via an IP multimedia subsystem (IMS) network connection.

Another hypothetical user network presence configuration is shown in FIG. 6 wherein a "work travel" configuration 27 includes use of access terminals comprising laptop 26 and a 3G wireless telephone 28. Both terminals 26 and 28 may be connected to a cellular carrier system via respective interfaces.

FIG. 7 shows yet another network presence configuration utilized by the subscriber when not at one of the other specific locations which results in limited access for the user. Thus, a "limited access" configuration utilizes only a PCS telephone 21 interfaced with the cellular carrier system. In each of the network presence configurations shown, the availability of the subscriber to receive various multimedia services depends upon the access terminals available and their respective multimedia capabilities. Some applications may involve delivery from one single multimedia service to multiple access terminals simultaneously over just one or over several transport networks.

Figure 8:
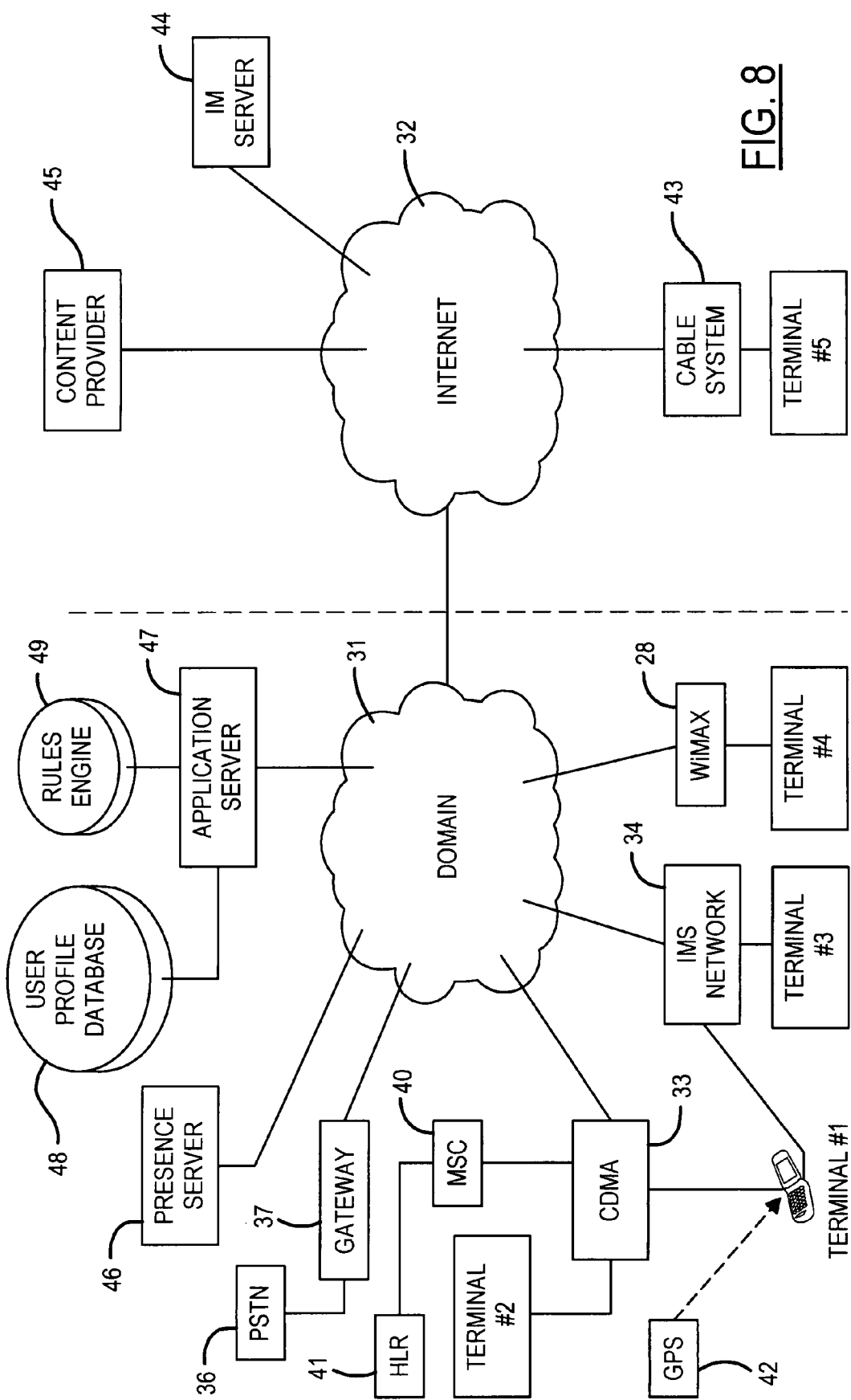
FIG. 8 is a block diagram showing a network architecture according to one preferred embodiment of the invention.

Turning now to FIG. 8, one preferred network architecture for the present invention is divided between a domain side 31 and an Internet side 32. Domain side 31 corresponds to a network owned and operated by a particular service provider that provides telecommunication service to a subscriber, typically according to a primary access terminal such as a cellular telephone being served by a cellular carrier. Domain 31 typically has several different network interfaces for communicating with access terminals operated by subscribers and others. In addition to an interface with Internet side 32, domain 31 has subscriber interfaces via a CDMA wireless telephone service 33, an IMS network interface 34, a WiMAX system 35, and a public switched telephone network (PSTN) 36 via a gateway 37. CDMA system 33 is connected to a mobile switching center (MSC) 40, which is connected to the home location register (HLR) 41 as is known in the art. An individual subscriber may interface with CDMA system 33 using either a terminal #1 and a terminal #2, for example. Terminal #1 may comprise a digital PCS handset which is interoperable with CDMA system 33 throughout its entire coverage area. Terminal #2 may comprise a computing device connected via an advanced 3G connection, for example. Terminal #1 may be equipped with a conventional GPS receiver to receive location signals from a GPS system 42.

Depending upon the location of the subscriber, the presence may also include use of a terminal #3 which is connected to IMS network 34. Also depending upon their presence, the IMS network 34 may also be able to interface with another access terminal of this subscriber such as terminal #1. The same subscriber may also utilize a terminal #4 which interfaces with WiMAX system 35.

The subscriber may also use a terminal #5 which does not connect directly to domain 31, but connects to Internet 32 through an Internet service provider (ISP) comprised of a cable system 43. Cable system 43 and domain 31 may cooperate to provide integrated multimedia services to the subscriber, such as commercially available in the PIVOT service from Sprint, but the present invention is likewise applicable to providing multimedia services without such an enhanced system. Multimedia services can also be provided via Internet 32 from an instant messaging (IM) server 44 and a content provider 45 (which may be a video-on-demand provider, for example). Moreover, the server providing multimedia content may also be located within domain 31.

The present invention employs a presence server 46 and an application server 47 coupled within domain 31. Application server 47 is further coupled to a user profile database 48 and a rules engine 49. Each access terminal utilized by the subscriber is capable of exchanging multimedia content with application server 47 according to its respective multimedia capabilities. No special client software is needed on the access terminals and the service provider of domain 31 can execute various multimedia services with the access terminals independently from a client/server model used in the past to adapt received content to the capabilities of individual terminals. User profile database 48 is user configurable for defining the desired network presence configurations for a particular subscriber according to the available terminals and their capabilities which are accessible at various locations. Rules engine 49 defines the necessary actions for application server 47 to interface with a particular access terminal to provide each respective multimedia service. Once the various presence configurations are defined within user profile database 48, presence server 46 registers a current presence identifier showing the current status of each particular subscriber.

Figure 9:
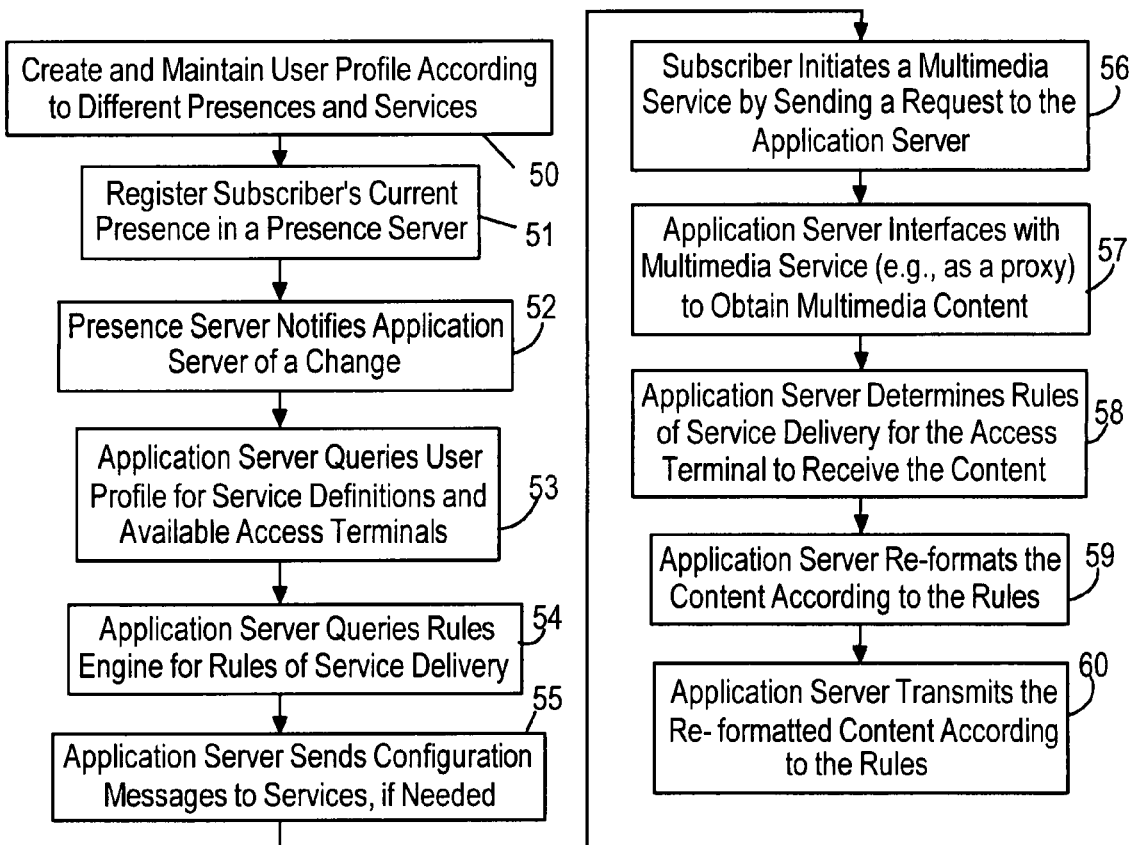
FIG. 9 is a flowchart showing one preferred method of the invention.

A preferred method of the invention is shown in FIG. 9. In step 50, a user profile is created and maintained according to different presences and the services desired by each particular subscriber. Typically, the user profile is configurable by both the service provider and the subscriber (subject to proper authentication, authorization, and billing). The application server may allow remote log on in order to present the user profile for editing.

In step 51, the subscriber's current presence is registered in the presence server. Preferably, the setup of the user profile database identifies respective presence identifiers (e.g., "home" or "office") associated with each network presence configuration so that the present server may select a corresponding presence identifier. Whenever the current presence identifier is updated in the presence server, it notifies the application server of such change in step 52. In response to the new presence identifier, the application server queries the user profile for service definitions and available access terminals corresponding to the current presence identifier in step 53. The service definitions include information concerning the specific applications or services to be utilized and their specific parameters for the device capabilities for each available access terminal at the particular presence. Based on the service definitions and available access terminals from step 53, the application server queries the rules engine for the rules of service delivery corresponding to the defined services. While the service definitions are selected according to the desires of the user to access various applications and services, the rules of service delivery are created and maintained within the domain by the service provider according to all the available applications and services and are directly invoked by the defined services in the user profile. When needed, the application server sends configuration messages to the services (e.g., other servers for implementing the desired services) in step 55. Such configuration messages may include set-up messages for informing the service of the parameters for delivering the service to the user in the current presence configuration.

After the initialization of the rules of service delivery, the application server waits until user activity that invokes the applications or services. Thus, in step 57, the application server interfaces with a multimedia service (e.g., the application server acts as a proxy) to obtain multimedia content whenever an inbound or outbound request is made for such multimedia content to be delivered to a particular access terminal in the current network presence configuration. Such a request may be made to the network by the access terminal by sending a request to the IMS network via an element such as the P-CSCF (proxy call session control function) based on a DNS entry in the application running within the access terminal. In step 58, the application server determines the specific rules of service delivery for the requested multimedia content for the particular access terminal involved. The application server re-formats the content according to those rules in step 59, and transmits the re-formatted content according to the rules in step 60.

Figure 10:
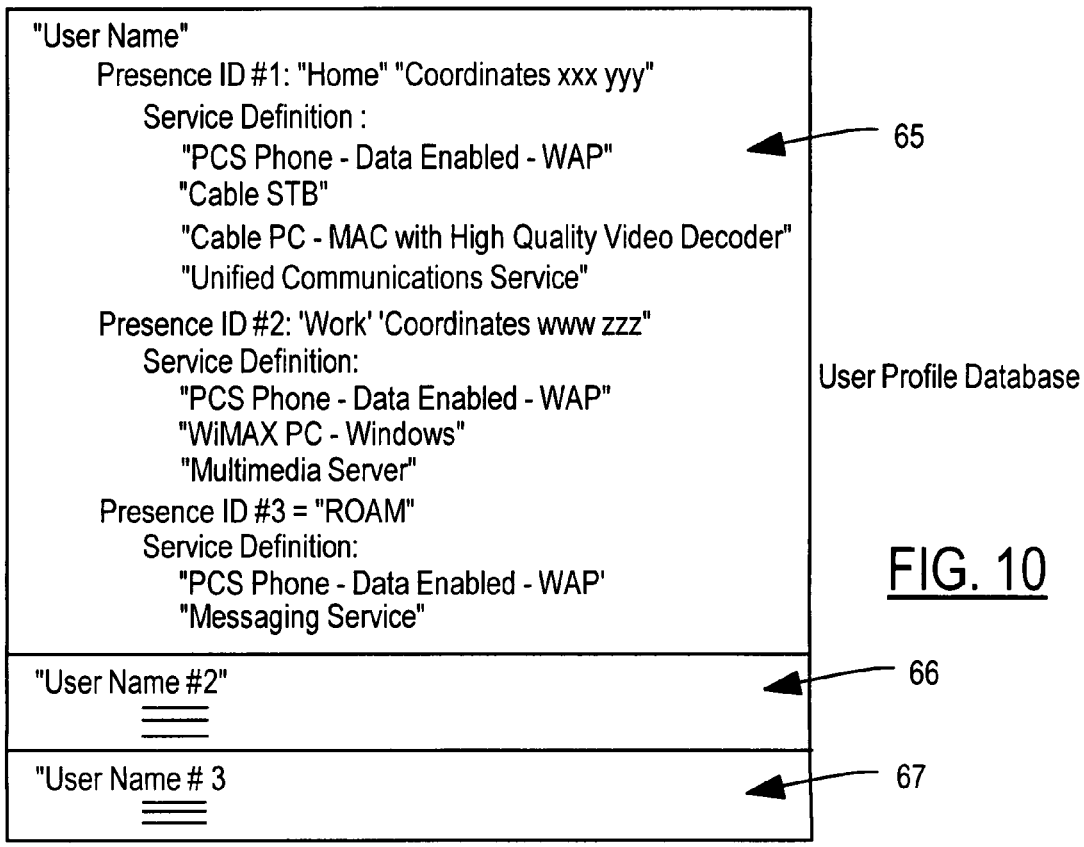
FIG. 10 shows sample records within a user profile database.

Sample contents of the user profile database are shown in FIG. 10. In a first record 65, a unique record is provided for a user having a corresponding "username". The user has configured their user profile record to have three unique presence identifiers, specifically "home", "work", and "roam". The home presence is further identified by geographic coordinates "xxx yyy", which may preferably comprise latitude and longitude values to permit automatic detection of the home presence using the GPS coordinates determined in a mobile handset (i.e., the coordinates are provided by the handset to the presence server for comparison with the coordinates in the user profile for automatically detecting arrival at the home presence). Record 65 specifies a service definition for the home presence, including identification of the corresponding access terminals and their multimedia capabilities together with any desired multimedia services to be available at the home presence (e.g., the unified communications service).

A second presence identified in record 65 is comprised of a "work" presence corresponding to geographic coordinates "www zzz". A separate service definition is provided for the work presence listing the access terminals and multimedia capabilities together with a "multimedia service" identifier (which may be a network specific bundle of service functions).

A third presence identifier in record 65 comprises "roam". No specific geographic coordinates are included since this presence would be activated any time the user is not at the home or work presence (i.e., when the current GPS coordinates do not match those defined for the other presence identifiers). The service definition includes a single access terminal comprised of a mobile cellular telephone such as a PCS phone which is data enabled according to the WAP standard. The appropriate application services for the roam presence are defined as a "messaging service" such as integrated voice and text messaging as defined by the particular service provider.

Other access terminal identifications within the service definitions may include terminals for which standard capabilities are assumed (e.g., the cable STB in the home presence) or for which multiple capability levels may be available and are specified within the service definition (e.g., a cable connected personal computer comprised of a Macintosh PC with a high quality video decoder as shown in the service definition for the home presence).

Figure 11:
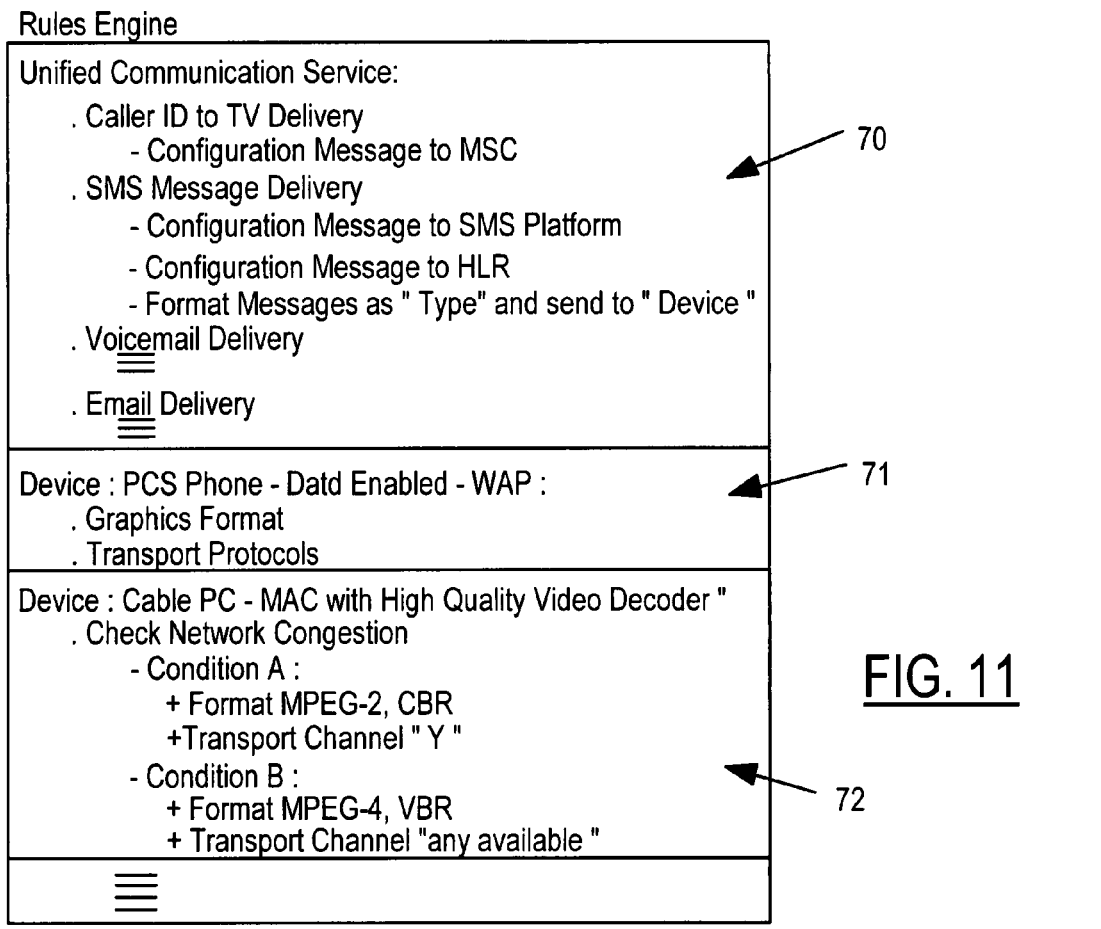
FIG. 11 shows sample records within a rules engine.

Examples of the rules within the rules engine are shown in FIG. 11. A first rule 70 corresponds to the unified communication service utilized in the home presence as shown in the example of FIG. 10. A first element of the unified communication service comprises the delivery of caller ID information to a television connected to a cable STB. A rule within this element is comprised of an instruction to send a configuration message to the MSC which commands the MSC to deliver caller ID information to the application server so that it may be forwarded to the cable STB. The unified communication service includes another element corresponding to SMS message delivery. The rules for SMS message delivery instruct the application server to send a configuration message to the SMS platform, to send a configuration message to the HLR, and to format messages as a predetermined type to send to a particular device as selected by the user. Other rules may also be provided for elements such as voicemail delivery and email delivery.

As shown by rule 71, a particular record within the rules engine may correspond to a device rather than a particular service. Thus, a mobile handset device identified as "PCS phone-data enabled-WAP" may include rules for specifying a graphics format and transport protocols to be used in delivering multimedia content to the mobile handset.

The rules engine may also be utilized to adapt delivery of multimedia content to instantaneous network conditions such as load or congestion. Thus, a rule 72 is defined for a device such as the cable PC-MAC with high quality video decoder. The rule defines a sequence of actions to check network congestion. For example, a predetermined threshold of congestion may be defined in order to determine a condition A when congestion is below the threshold and a condition B when congestion is above the threshold. With low load or congestion, a detection of condition A invokes a rule specifying a format such as Mpeg-2 with a constant bit rate and a specific transport channel "y". When condition B is present, the application server uses an Mpeg-4 format with a variable bit rate for the reformatting of multimedia content and selects any available transport channel.

Figure 12:
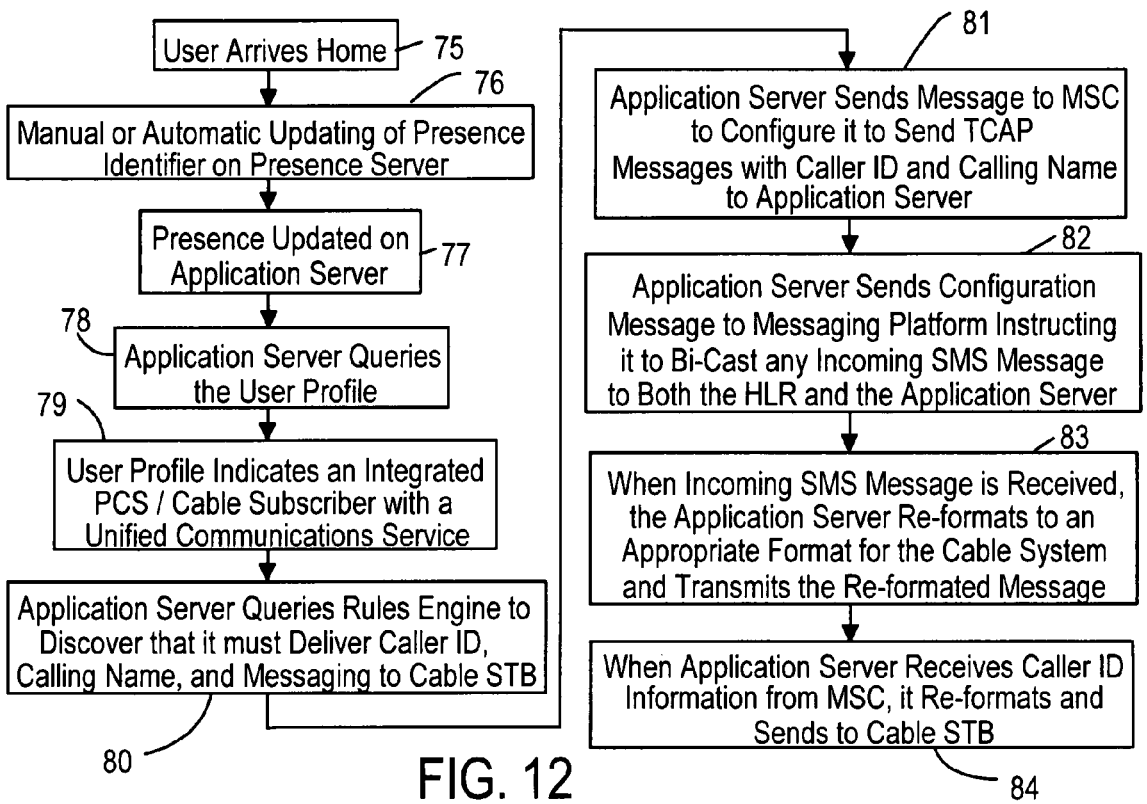
FIG. 12 shows a sequence of events for a first example of the invention.

FIG. 12 shows an example sequence of events occurring when a user arrives home at step 75. In step 76, a manual or automatic updating of the presence server is performed on the presence server. The updated presence is propagated to the application server in step 77 and the application server queries the user profile in step 78 according to the updated presence identifier. In step 79, the application server ascertains that the user profile indicates an integrated PCS/cable subscriber with a Unified Communication Service. The application server then queries the rules engine in step 80 to discover that it must deliver caller ID, calling name, and messaging to the cable STB in parallel with the user's mobile handset. To implement the caller ID function, the application server implements rules in step 81 that cause it to send a message to the MSC to configure the MSC for sending a TCAP message with caller ID and calling name to the application server whenever an incoming call is received. In conformance with the messaging rule, the application server sends a configuration message to the messaging platform in step 82 instructing the messaging platform to bi-cast any incoming SMS message to both the HLR and the application server. When an incoming SMS message is received in step 83, then the application server re-formats the message to an appropriate format for the cable system and then transmits the re-formatted message to the STB. While continuing to be in the home presence, when the application server receives caller ID information from the MSC in step 84, it re-formats the caller ID information into an appropriate format and sends it to the cable STB for display on the television monitor.

Figure 13:
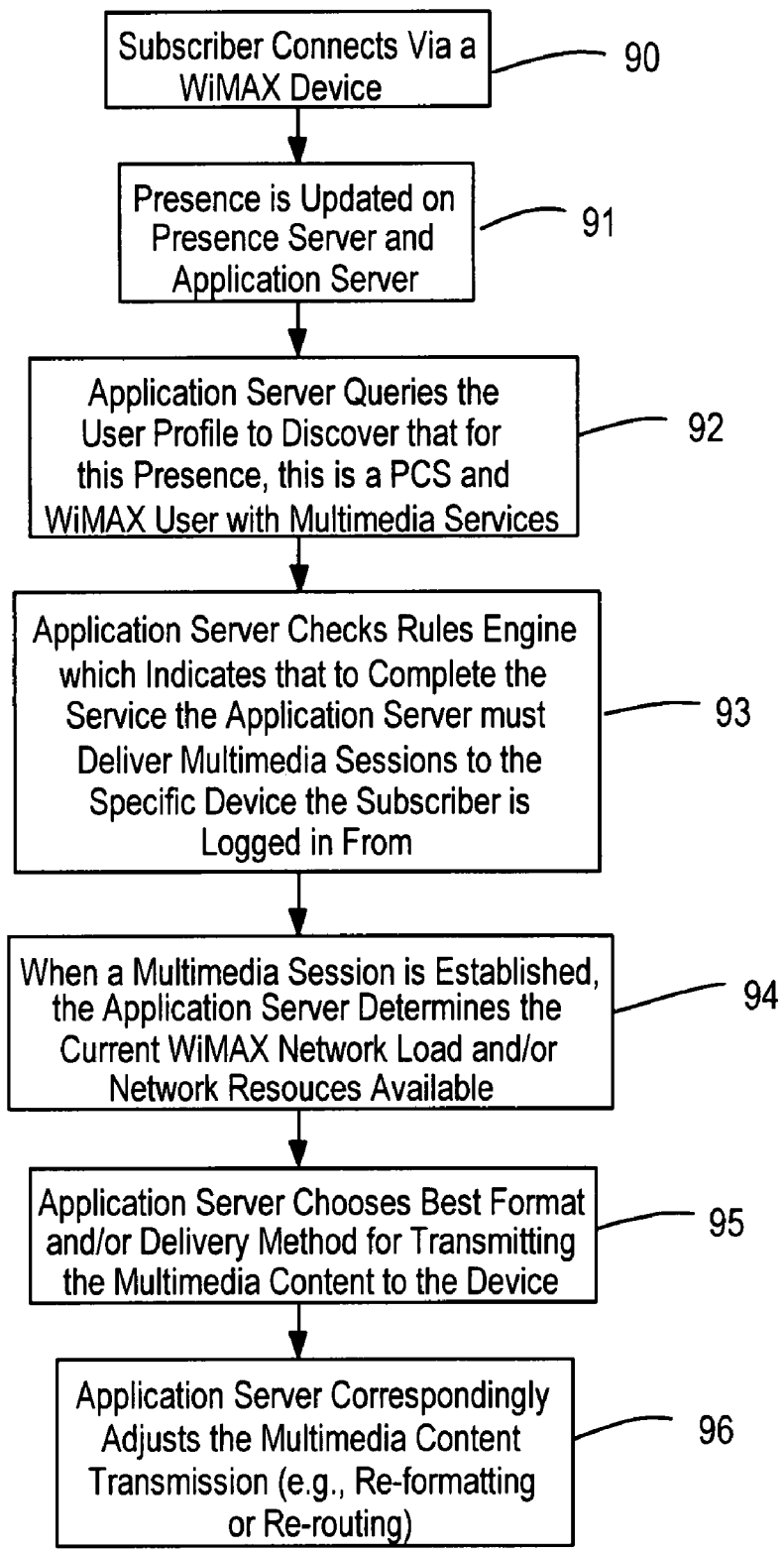
FIG. 13 shows a sequence of events for a second example of the invention.

FIG. 13 shows yet another example of a sequence of events when implementing a new presence configuration wherein detection of the new presence configuration results from a subscriber connecting via a particular channel such as a WiMAX device in step 90. Thus, when a particular channel is uniquely associated with a particular presence configuration, then user activity in that channel identifies the user presence. In step 91, the presence is updated on both the presence server and the application server. The application server queries the user profile in step 92 to discover that for this presence the subscriber is a PCS and WiMAX user with multimedia services. In step 93, the application server checks the rules engine which indicates that to complete the service the application server must deliver multimedia sessions to the specific device the subscriber is logged in from. Whenever a specific multimedia session is established within such multimedia service, the application server determines the current WiMAX network load or network resources available in step 94. Based on the available load or resources, the application server chooses the best format and/or delivery method for transmitting the multimedia content to the device in step 95. In step 96, the application server correspondingly adjusts the multimedia content transmission by re-formatting or re-routing the multimedia content within the particular multimedia session on the WiMAX network.

What is claimed is:

1. A method of providing multimedia services to a subscriber within a domain of a communication network, wherein the subscriber utilizes one or more predetermined access terminals to access the multimedia services according to a current network presence configuration of the subscriber selected from a plurality of network presence configurations, wherein each access terminal has respective multimedia capabilities, and wherein the domain includes an application server for accessing the multimedia services, the method comprising the steps of:

establishing a user profile for the subscriber including a plurality of presence identifiers, the user profile relating each respective presence identifier to a respective user service definition, wherein each user service definition specifies a set of the predetermined access terminals and respective multimedia services to be available for a respective network presence configuration;

registering a current presence identifier of the subscriber;

the application server accessing the user profile to determine a user service definition corresponding to the current presence identifier;

the subscriber initiating one of the multimedia services by sending a request to the application server from one of the access terminals in the set of predetermined access terminals;

the application server interfacing with the multimedia service to obtain multimedia content from the initiated multimedia service;

the application server determining rules of service delivery according to the set of predetermined access terminals;

the application server re-formatting received multimedia content according to the rules of service delivery for the set of predetermined access terminals; and the application server transmitting re-formatted multimedia content to the corresponding access terminals.

2. The method of claim 1 further comprising the step of manually configuring the user profile by accessing a profile database within the domain.

3. The method of claim 1 wherein the registering step comprises the subscriber manually updating the current presence identifier by accessing a profile database within the domain.

4. The method of claim 3 wherein an access terminal used by the subscriber to manually update the current presence identifier comprises a cellular telephone.

5. The method of claim 3 wherein an access terminal used by the subscriber to manually update the current presence identifier comprises a microcomputer.

6. The method of claim 1 wherein the registering step comprises automatically updating the current presence identifier by detecting a physical location of the subscriber.

7. The method of claim 6 wherein the physical location is detected by a GPS receiver contained in a cellular telephone, wherein a profile database within the domain stores the user profile and the current presence identifier, and wherein the detected physical location is transmitted by the cellular telephone to the profile database.

8. The method of claim 1 wherein the rules of service delivery identify a device type corresponding to an access terminal within the set of predetermined access terminals, and wherein the device type indicates a corresponding level of multimedia capabilities.

9. The method of claim 1 wherein the rules of service delivery identify a media type corresponding to an access terminal within the set of predetermined access terminals, and wherein the media type indicates a multimedia format.

10. The method of claim 1 wherein the rules of service delivery include a determination of network load and a corresponding adjustment of re-formatted multimedia content transmission.

11. The method of claim 1 further comprising the step of:
the application server sending a configuration message to one of the multimedia services in response to the rules of service delivery in order to enable one of the rules of service delivery.

12. A system for providing multimedia services to a subscriber within a domain of a communication network, wherein the subscriber utilizes one or more predetermined access terminals to access the multimedia services according to a current network presence configuration selected from a plurality of network presence configurations of the subscriber, wherein each access terminal has respective multimedia capabilities, the system comprising:

a user profile database including a user profile for the subscriber relating respective presence identifiers to respective user service definitions, wherein each user service definition specifies a set of the predetermined access terminals and respective multimedia services to be available for a respective network presence configuration;

a presence server for registering a current presence identifier of the subscriber selected from the respective presence identifiers;

a rules database including respective rules of service delivery for the user service definitions;

an application server for accessing the multimedia services on behalf of the subscriber, wherein the application server accesses the user profile to determine a user service definition corresponding to the current presence identifier, wherein the application server receives a subscriber request for initiating one of the multimedia services, wherein the application server interfaces with the multimedia service to obtain multimedia content from the initiated multimedia service, wherein the application server retrieves rules of service delivery according to the set of predetermined access terminals and the user service definition of the initiated multimedia service, wherein the application server re-formats received multimedia content according to the rules of service delivery for the set of predetermined access terminals, and wherein the application server transmits re-formatted multimedia content to the corresponding access terminals.

13. The system of claim 12 wherein the user profile database includes geographic coordinate information associated with respective presence identifiers, and wherein one of the access terminals sends current geographic coordinates to the presence server to automatically register the current presence identifier.

14. The system of claim 12 wherein the rules of service delivery identify a device type corresponding to an access terminal within the set of predetermined access terminals, and wherein the device type indicates a corresponding level of multimedia capabilities.

15. The system of claim 12 wherein the rules of service delivery identify a media type corresponding to an access terminal within the set of predetermined access terminals, and wherein the media type indicates a multimedia format.

16. The system of claim 12 wherein the rules of service delivery include a determination of network load and a corresponding adjustment of re-formatted multimedia content transmission.

17. The system of claim 12 wherein the application server sends a configuration message to one of the multimedia services in response to the rules of service delivery in order to enable one of the rules of service delivery.

* * * * *